May 30, 1961  B. BARÉNYI  2,986,425
PASSENGER MOTOR VEHICLE WITH REAR ENGINE
Filed Sept. 3, 1957
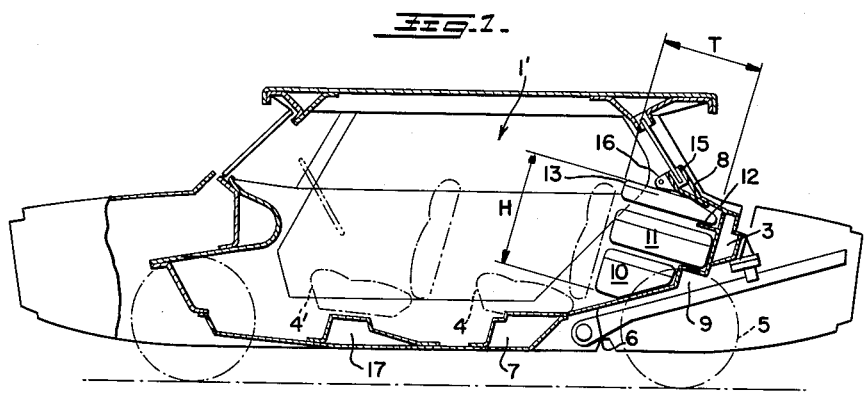
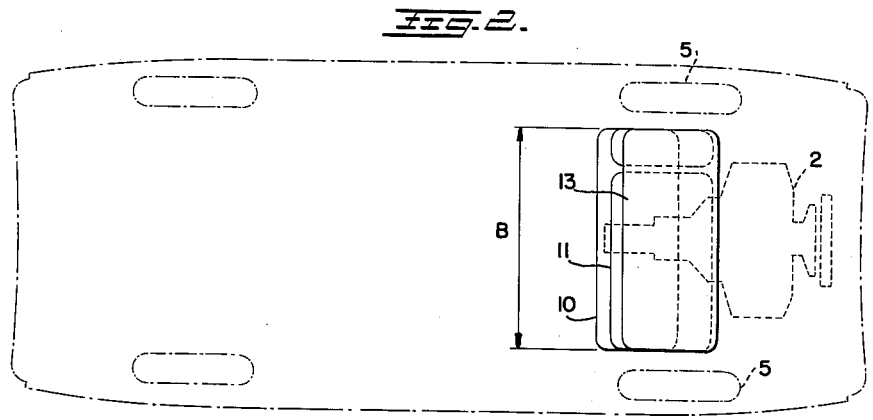
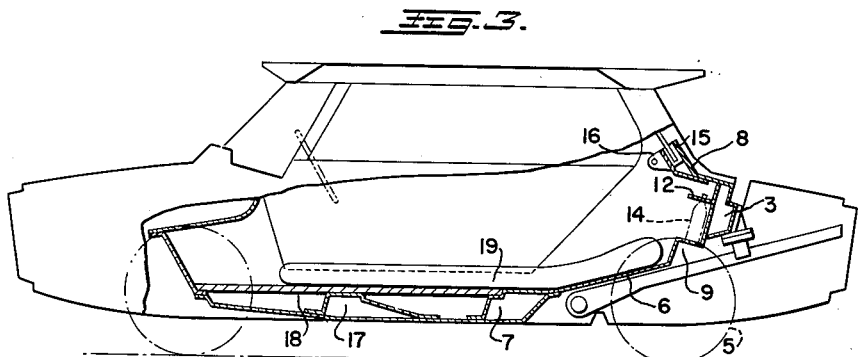
INVENTOR
BÉLA BARÉNYI
BY  *Dicke and Craig*
ATTORNEYS

United States Patent Office 2,986,425
Patented May 30, 1961

2,986,425
PASSENGER MOTOR VEHICLE WITH REAR ENGINE

Béla Barényi, Stuttgart-Vaihingen, Germany, assignor to Daimler-Benz Aktiengesellschaft, Stuttgart-Untertürkheim, Germany Filed Sept. 3, 1957, Ser. No. 681,736
Claims priority, application Germany Sept. 22, 1956
11 Claims. (Cl. 296—37)

The present invention relates to a passenger motor vehicle with a rear engine and with a luggage compartment arranged between the rear engine and the rear back rest of the rear seat, with the luggage compartment being accessible from the vehicle interior after holding down the back rests of the back seats.

The present invention essentially consists in that the luggage space is closed off rearwardly by an elevated cross bearer member and from below by a floor or bottom inclined upwardly rearwardly which extends the surface of a cross bearer member arranged below the rear seat in the rearward direction.

The present invention enables the creating, in an advantageous manner, of as large as possible a luggage space within the rear part of a passenger motor vehicle without in any way impairing the rigidity of the rear portion of the vehicle.

According to the present invention, the rear cross bearer member may be constructed appropriately box-shaped and the wall thereof forming the terminal wall of the luggage space may be disposed approximately parallel to the rear wall of the back rests of the rear seats. Furthermore, the luggage space may be at least partially closed off advantageous at the top by a flat wall inclined rearwardly downwardly, and, as seen in side view, the luggage space may have the shape of a trapezoid.

The luggage compartment in accordance with the present invention may advantageously be subdivided in the horizontal direction by the fact that the floor or bottom of the luggage compartment is provided directly in front of the rear wall formed by the cross bearer member with a step, the upper surface of which is disposed essentially perpendicularly to the terminal wall of the cross bearer, and which forms the support for a trunk or suitcase. The space between the bottom-step and the rear seat may appropriately be utilized by the accommodation of a container, for example, of a suitcase for shoes, the upper surface of which is normally disposed in the same plane as the upper surface of the step and thereby also serves as support for the suitcase disposed thereabove. The suitcase for the shoes may thereby be subdivided into separate shoe compartments in the longitudinal direction of the motor vehicle to accommodate therein the shoes.

A further subdivision of the luggage space may appropriately be achieved in that at a distance above the bottom step and parallel thereto an intermediate shelf is arranged at the rear cross bearer member and that a further container or suitcase may be disposed thereupon. Apertures may be appropriately provided in the intermediate shelf the inner diameters of which are slightly larger than the diameters of drinking bottle throats. These apertures in the intermediate bottom may thereby serve to secure drinking bottles which rest on the bottom step and which extend with the throats thereof into the apertures. The container or suitcase disposed on the intermediate shelf may be at least partially open on top thereof.

For purposes of illumination of the luggage space, an illuminating device may be provided within the same above the bottom which may also be constructed as a reading lamp. The illuminating device may advantageously be arranged at an appropriate tubularly shaped cross bearer member which itself forms the forward edge of the upper terminal wall of the luggage space and thereby reinforces the same.

A further advantage of the present invention consists in that with a camping-type passenger motor vehicle provided with removable seats sleeping accommodations may be prepared or installed on the floor of the luggage space. This may be realized in accordance with the present invention in that, with an emptied out luggage space and with the seats removed, the bottom of the luggage compartment forms the support for the head part of one or several mattresses. A support surface may be appropriately produced for the rest of the mattress in a simple manner by the insertion of an intermediate or auxiliary bottom over the floor or bottom of the passenger space, the surface of which lies in a common plane with the upper surface of the cross bearer member which is arranged below the rear seat.

Accordingly, it is an object of the present invention to provide a spacious luggage compartment in a motor vehicle having a rear engine.

It is still another object of the present invention to provide a particularly appropriate luggage compartment the space of which is utilized as fully as possible and which is disposed between an elevated rear cross bearer member and the rear surface of the back rest of the rear seat.

Still another object of the present invention is to provided a roomy luggage compartment for a rear engine passenger motor vehicle in which the luggage compartment is readily accessible from the passenger space within the vehicle and which is so constructed and arranged as not to impair but rather increase the rigidity of the rear part of the vehicle.

Still another object of the present invention is the provision of a roomy and convenient luggage compartment in a cellular type motor vehicle provided with a rear engine the floor or bottom of which is adapted to be used as part of the mattress support in case of use of the vehicle interior space as sleeping accommodations for the passengers.

These and other objects, features and advantages of the present invention will become more obvious from the following description when taken in connection with the accompanying drawing which shows, for purposes of illustration only, one embodiment in accordance with the present invention and wherein:

Figure 1 is a partially schematic longitudinal cross-sectional view of a passenger motor vehicle in accordance with the present invention;

Figure 2 is a plan view of the passenger motor vehicle shown in Figure 1 with parts thereof omitted for clarity's sake; and Figure 3 is a longitudinal cross-sectional view similar to Figure 1 through the passenger motor vehicle in which the passenger space has been converted into a sleeping space for the passengers.

Referring now to the drawing, wherein like reference numerals are used throughout the various views to designate like parts, reference numeral 1' generally designates the sedan-type top enclosing the passenger space and including a flat roof forming part of the pontoon-shaped vehicle body generally designated by reference numeral 1 of a passenger motor vehicle. The motor vehicle is provided with a rear engine 2 disposed, for example, in the vehicle rear cell. Since the top 1' and the motor vehicle body 1 as well as the engine 2 and chassis of the vehicle may be of any suitable construction, for example, as disclosed in my copending application Serial No. 681,737, filed September 3, 1957, entitled Frame Construction for Motor Vehicles, and Serial No. 681,732, filed September 3, 1957, entitled Passenger Space Construction of a Motor Vehicle, the same have been shown only schematically in the drawing.

An appropriately box-shaped cross bearer member 3 is arranged above the engine 2 in the rear part of the motor vehicle body in such a manner that it lies above the top edge of the rear tires and that the upper edge thereof terminates with the outer body wall of the rear part of the motor vehicle body 1. The forward or front face of cross bearer member 3 is of considerable vertical extent and forms the rear boundary wall of a luggage space which extends forwardly up to the foldable back rests of the rear seats 4 and which extends laterally to the rear wheels 5. The luggage space is closed off downwardly by a bottom 6 which connects the upper surface of a cross bearer member 7 arranged below the rear seats 4 with the lower edge of the cross bearer member 3. An appropriately shaped flat wall 8 forms the upper terminal wall of the luggage compartment which wall 8 passes over into the vehicle body at the rear part of the passenger motor vehicle body. As seen in side view, the luggage compartment in accordance with the present invention is trapezoidal in shape having a depth T and having a maximum height H directly behind the back rests of the rear seats 4.

A transversely extending step 9 is provided in the bottom 6 of the passenger space directly in front of the cross bearer member 3 which step 9 may possibly be constructed as a reinforcing cross bearer member and the upper surface of which is disposed perpendicular with respect to the rear walls of the back rests of seats 4 and with respect to the longitudinal front wall of the cross bearer member 3 which itself extends transversely of the longitudinal direction of the vehicle and is essentially parallel with the rear walls of the back rests.

A container or suitcase 10 is removably arranged in the space disposed between the step 9 and the back rests of the seats 4. As seen in Figure 2, the container 10 rests on the inclined part of bottom 6 and is shaped approximately triangularly so that the upper surface thereof lies in a common plane with the upper surface of the step 9. The container 10 may appropriately be constructed as a shoe suitcase and may possibly be subdivided into several compartments in the longitudinal direction of the vehicle body. The upper surfaces of the step 9 and of the container 10 serve as support for another suitcase 11 which in its dimensions are adapted to the plan view of the luggage space i.e., is of about the same size as the luggage compartment as seen in plan view, and which may also be appropriately subdivided. Possibly the suitcase 11 may also be so dimensioned that it does not extend over the entire width of the luggage compartment and that instead a smaller suitcase may be disposed alongside thereof to fill the full width of the luggage compartment whereby the smaller suitcase may be of the same height as the suitcase 11.

An auxiliary or intermediate bottom 12 is arranged at the cross bearer member 3 above the suitcase 11 which bottom 12 is disposed parallel to the upper surface of the floor step 9. The intermediate bottom 12 serves as support for a further container or suitcase 13 which may be provided at the surface thereof with apertures adapted to be closed, for example, by a lid. Apertures may also be provided in the intermediate bottom 12, the inner diameters of which are slightly larger than the diameters of the throats of bottles adapted to be used on trips. As may be seen from Figure 3, the throats of drinking bottles 14 extend through these apertures while the bottles 14 rest on the upper surface of the floor step 9.

An illuminating or lighting device 16 may be arranged at the forward edge of the terminal wall 8 possibly within the region of a tubularly shaped cross bearer member 15 which device 16 serves as a reading lamp for the area of the back seats 4 or as a reading lamp for the sleeping accommodation or beds when the vehicle is converted during nightfall as shown in Figure 3.

As can be clearly seen from Figure 3, after removal of the rear seats 4, the front seats 4' and of the containers 10, 11 and 13, a sleeping accommodation may be prepared on the floor of the passenger space. For that purpose, an auxiliary or false bottom 18 is inserted between the cross bearer member 7, a further cross bearer member 17 disposed below the front seats 4' and the forward end of the passenger space which bottom 18 is so arranged that it lies in the same plane with the surface of the cross bearer member 7. This may be accomplished by an appropriate shoulder formed in the cross bearer member 7. The false bottom 18 and the bottom 6 of the passenger space thereby serve as support for one or two mattresses 19, the head part of which is slightly raised by reason of the inclined arrangement of the floor 6. The illuminating or lighting device 16 which is disposed above the head end of the mattress 19 serves in that case as a reading lamp.

While I have shown and described one embodiment in accordance with the present invention, it is understood that the same is not limited thereto but is susceptible of many changes and modifications within the spirit of the present invention and I intend to cover all such changes and modifications as encompassed by the appended claims.

I claim:

1. A passenger motor vehicle with a rear engine and having front and rear wheels and frame means comprising seat means provided with back rests, elevated cross bearer means forming part of said frame means and disposed in the rear part of the vehicle essentially above the upper edge of the rear wheels, a luggage compartment delimited in front thereof by the rear walls of said back rests, said cross bearer means having a forwardly facing wall of considerable vertical extent to rearwardly delimit the luggage compartment, rearwardly upwardly inclined bottom means delimiting said luggage compartment from below, and a cross bearer member disposed below said seat means, said bottom means extending rearwardly from the surface of said cross bearer member.

2. A passenger motor vehicle according to claim 1, wherein said cross bearer means is of box-shaped construction with the forwardly facing wall therof delimiting said luggage compartment extending essentially parallel to the back walls of said back rests.

3. A passenger motor vehicle according to claim 1 further comprising essentially flat wall means inclined downwardly rearwardly for at least partially delimiting said luggage compartment from above, whereby said luggage compartment has approximately the shape of a trapezoid as seen in side view.

4. A passenger motor vehicle according to claim 1, wherein said seat means are removable seat means, and wherein said bottom means constitutes the head rest for a sleeping accommodation upon removal of said removable seats.

5. A passenger motor vehicle according to claim 4, further comprising an auxiliary bottom adapted to be mounted on said cross bearer member so as to have a planar surface with the surface of said cross bearer member and forming a support for sleeping accommodations for the passengers.

6. A passenger motor vehicle with a rear engine having front and rear wheels and frame means comprising seat means provided with back rests, elevated cross bearer means disposed in the rear part of the vehicle assembly at least a considerable distance above the upper edge of the rear wheels and forming part of said frame means, a luggage compartment delimited in front therof by the rear walls of said back rests, and rearwardly by a front face, of considerable vertical extent, of said cross bearer means, rearwardly upwardly inclined bottom means delimiting said luggage compartment from below and provided with a step directly in front of said cross bearer means, the upper surface of said step extending essentially perpendicularly to the front face of said cross bearer means which rearwardly delimits said luggage compartment and forming itself a support surface for luggage, and a cross bearer member disposed below said seat means, said bottom means extending rearwardly from the surface of said cross bearer member, and said luggage compartment being accessible from within the vehicle after folding the back rests.

7. A passenger motor vehicle according to claim 6, further comprising container means between said step and said seat means resting on said inclined bottom means and being of such dimension that the upper surface thereof lies in a common plane with the surface of said step.

8. A passenger motor vehicle according to claim 6, further comprising an intermediate shelf means secured at said cross bearer means at a distance above said step, said intermediate shelf means being essentially parallel to the surface of said step to accommodate thereon further suitcases.

9. A passenger motor vehicle according to claim 8, wherein said intermediate shelf means is provided with apertures of such diameter as to receive the throat portions of bottles when the latter are placed upon said step to thereby retain the bottles in position.

10. A passenger motor vehicle according to claim 9, further comprising a container at least partially open at the top and disposed on said intermediate shelf means.

11. A passenger motor vehicle according to claim 6, wherein said vehicle includes a passenger compartment having a floor and wherein said seat means are removable, and further comprising auxiliary bottom means adapted to be installed in the passenger space of the vehicle above the floor thereof to provide a support for sleeping accommodations lying in a single plane and formed by the upper surface of said auxiliary bottom means of said cross bearer member.

References Cited in the file of this patent

UNITED STATES PATENTS

| | | |
|---|---|---|
| 1,609,113 | Gebhardt | Nov. 30, 1926 |
| 2,095,344 | Nelson | Oct. 12, 1937 |
| 2,101,748 | Michel et al. | Dec. 7, 1937 |

FOREIGN PATENTS

| | | |
|---|---|---|
| 769,380 | France | June 5, 1934 |
| 870,108 | France | Dec. 5, 1941 |
| 977,539 | France | Nov. 15, 1950 |
| 801,757 | Germany | Jan. 22, 1951 |
| 878,466 | Germany | Aug. 24, 1953 |
| 678,422 | Great Britain | Sept. 3, 1952 |